United States Patent [19]

Norbäck et al.

[11] 4,405,533

[45] Sep. 20, 1983

[54] SUPPLY DEVICE FOR USE WITH EVAPORATIVE CONTACT BODIES

[75] Inventors: Per Norbäck, Lidingo; Borje Eriksson, Sigtuna, both of Sweden

[73] Assignee: AB Carl Munters, Sollentuna, Sweden

[21] Appl. No.: 385,437

[22] Filed: Jun. 7, 1982

Related U.S. Application Data

[63] Continuation of Ser. No. 122,838, Jan. 17, 1980, abandoned, which is a continuation of Ser. No. 944,246, Sep. 21, 1978, abandoned.

[30] Foreign Application Priority Data

Sep. 21, 1978 [SE] Sweden .............................. 7710656

[51] Int. Cl.³ .............................................. B01F 3/04
[52] U.S. Cl. .................................... 261/111; 261/112; 261/DIG. 11
[58] Field of Search ............... 261/111, 112, DIG. 11, 261/DIG. 77; 55/257 PV

[56] References Cited

U.S. PATENT DOCUMENTS

| | | | |
|---|---|---|---|
| 1,987,881 | 1/1935 | Von Seggern et al. | 261/DIG. 11 |
| 3,372,529 | 3/1968 | Harms | 261/112 |
| 3,374,992 | 3/1968 | Greer | 261/112 |
| 3,450,393 | 6/1969 | Munters | 261/112 |
| 3,792,841 | 2/1974 | Munters | 261/112 |
| 3,795,388 | 3/1974 | Toth | 261/DIG. 11 |
| 4,117,049 | 9/1978 | Carrico | 261/DIG. 11 |

FOREIGN PATENT DOCUMENTS

| | | | |
|---|---|---|---|
| 461944 | 6/1928 | Fed. Rep. of Germany | 261/112 |
| 1320500 | 6/1973 | United Kingdom | 261/DIG. 11 |

Primary Examiner—Tim R. Miles
Attorney, Agent, or Firm—Curtis, Morris & Safford

[57] ABSTRACT

A supply device for use in an evaporative contact body of the multi-layer type having gaps between the layers of the body to which water is supplied from above comprises water supply pipes having outlet openings formed therein. The pipes are in direct contact with the top of the contact body or may be embedded therein, and the pipe openings are located to direct water jets directly inside the gaps between the layers of the contact body.

5 Claims, 4 Drawing Figures

SUPPLY DEVICE FOR USE WITH EVAPORATIVE CONTACT BODIES

This application is a continuation of application Ser. No. 122,838 filed Jan. 17, 1980, now abandoned, whch is a continuation of application Ser. No. 944,246, filed Sept. 21, 1978, now abandoned.

The present invention relates to a supply device for use with an evaporative contact body, for example a cooling tower, which contact body is of the multi-layer type with gaps existing between the layers and to which gaps water is supplied from above through pipes and outlet openings and air is supplied from below.

In known applications of evaporative bodies of the kind in consideration water is supplied through a piping system which is erected at a distance above the contact body and which comprises a number of main and branch pipes and nozzle openings or jets disposed with even distribution above the surface upon which water is to be poured. Such piping becomes very comprehensive and bulky and must, in addition, be positioned at a substantial distance above the contact body in order to obtain sufficient distribution of the water. In this connection the piping often is supported by a frame structure located above the contact body. As the air streaming through the contact body from below has a tendency to entrain the water before the water has entered the contact body, there also must be provided drop traps for separating water from the air stream. Thus, the known water supply system has many disadvantages due to its bulky shape and the increase of the overall height of the whole plant which at the same time requires a greater pumping effect, since the water must be transported to the level of the piping.

The main object of the invention is to provide a water supply device for use with evaporative coolers which avoids the above mentioned drawbacks.

This is accomplished by the supply device according to the invention being characterized therein that openings thereof are located at the top edges of the layers of the contact body so that water jets leaving the openings hit the layers deep inside the gaps therebetween.

In a further development of the device according to the invention the supply device uses tubular pipes which are at least partially embedded below the top surface of the contact body.

By the described design very substantial advantages are obtained in comparison to known supply devices. Thus, the total structural height of the plant is reduced and the required pumping effect becomes lower since the water need not be transported upwards higher than the top surface of the contact body proper. The required pumping effect is reduced further by the fact that no water jets are used thus no pressure drop in them must be overcome. Since the water is not supplied to the layers of the contact body from a position spaced above the contact body but instead is supplied directly and deep inside the gaps between the layers, the tendency of the water to follow with the upwards advancing air stream is reduced, whereby drop separators can be eliminated.

Other advantages and characteristics of the invention will become evident from the following description of embodiments in the accompanying drawings.

Figure 1:
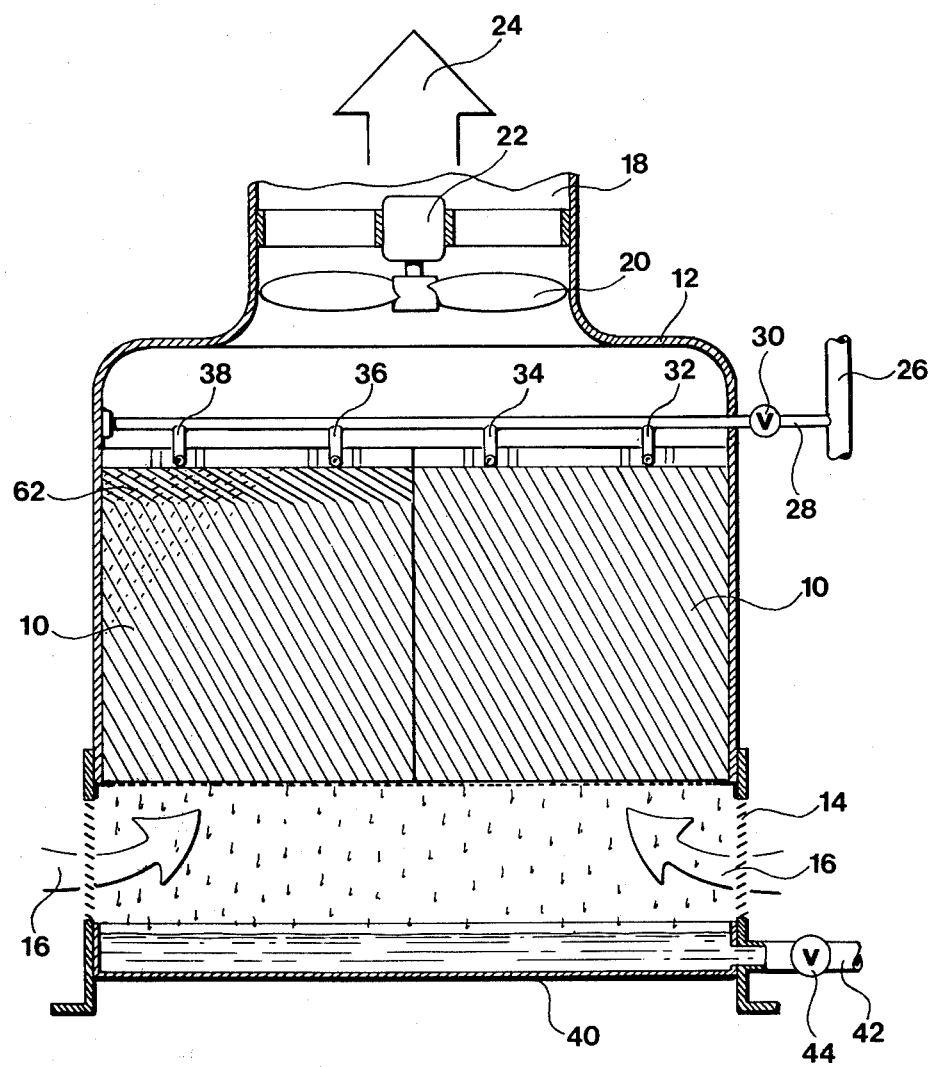
FIG. 1 shows a vertical section through an evaporative cooler, such as a cooling tower, of the counter-current type, to which the invention is applied.

The cooling tower shown in FIG. 1 which is of the counter-current type, comprises a casing 12 which houses contact bodies 10 each of which is composed of layers or sheets disposed in parallel so as to form between them vertical gaps or channels. In the shown embodiment the layers are all corrugated with the corrugations crossing one another in every second layer, as is indicated with dashed lines in the upper part of the left-hand body 10 in FIG. 1. All corrugations extend with an angle to the vertical line and bear against one another at the pointwise distributed places of contact. This structure is known from e.g. the U.S. Pat. Nos. 3,682,747 and 3,415,502. The layers may be of plastic or other material which is scarcely permeable to water.

The casing 12 is at opposite sides formed with lateral openings 14 for atmospheric air which enters along the arrows 16. The casing has at its top a discharge opening 18 within which is provided an impeller 20 which is driven by a motor 22. The atmospheric air sucked in through the lateral openings will thus be caused by the impeller 20 to flow in a mainly vertical direction upwards after the passage through the contact bodies 10 and is expelled through the opening 18 as is marked by the arrow 24. Positioned in the top portion of the contact bodies is a water distributing system comprising a main 26 and a branch duct 28 which via a valve 30 supplies water to branch pipes 32, 34, 36, and 38.

The cooled water which has passed through the contact bodies 10 is collected in a sump 40 at the bottom of the cooling tower and is discharged through a pipe 42 controlled by a valve 44 to the place of utilization, from which it in known manner upon renewed heating is returned through the main 26 to the cooling tower.

Figure 2:
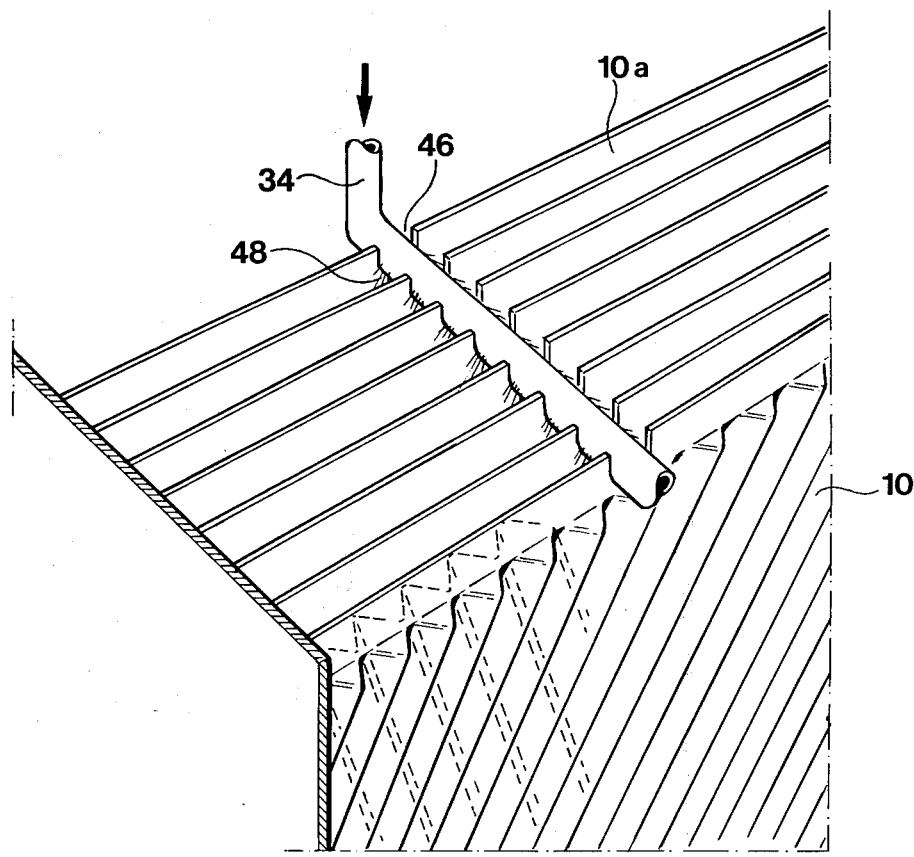
FIG. 2 is a perspective view of the top part of a contact body in the cooler of FIG. 1.

As seen in FIGS. 1 and 2, the water supply pipes, (only one pipe 34 is shown in FIG. 2), are lowered below the top surface of the contact body 10 with the pipes being located in recesses 46 in the layers 10a of the contact body. The pipe 34 is formed with small openings marked in the figure by water jets 48 which thus are generated below the upper edges of the layers so that the water jets 48 leaving the pipes hit the layers only from inside the gaps and not from above the contact body. By the water pipes 32–38 being embedded in the contact body 10 a lower overall height of the plant is achieved, as will be understood from FIG. 1. It is obvious that the supply pipe 28 also can extend on the same level as the distribution pipes by being embedded in the contact body, even if in the interest of clarity said pipe 28 is shown in a position above the top surface of the contact body. By supplying the water as jets one avoids the fine drops which are produced when water discharged from nozzles under high pressure hits the top surface of the contact body, as in prior art arrangments and is disintegrated into small particles. In most cases this problem is mastered without any drop separators, since the top portions of the layers serve as drop traps for the drops generated within the layer gaps.

A condition for the described result is that the layers have a strong effect of distribution in lateral direction. Such more rapid distribution of the water in the top portion of the contact body also renders it possible to reduce the number of supply pipes. This is brought about, as shown in the upper part of the left-hand contact body in FIG. 1, by the corrugations in this upper part extending with a smaller angle to the horizontal plane as is indicated at 62. The lower part of the contact body may, however, have corrugations extending with a steeper angle to the horizontal plane for obtaining best possible exchange of heat between the air and the water and reducing the pressure drop.

Figure 3:
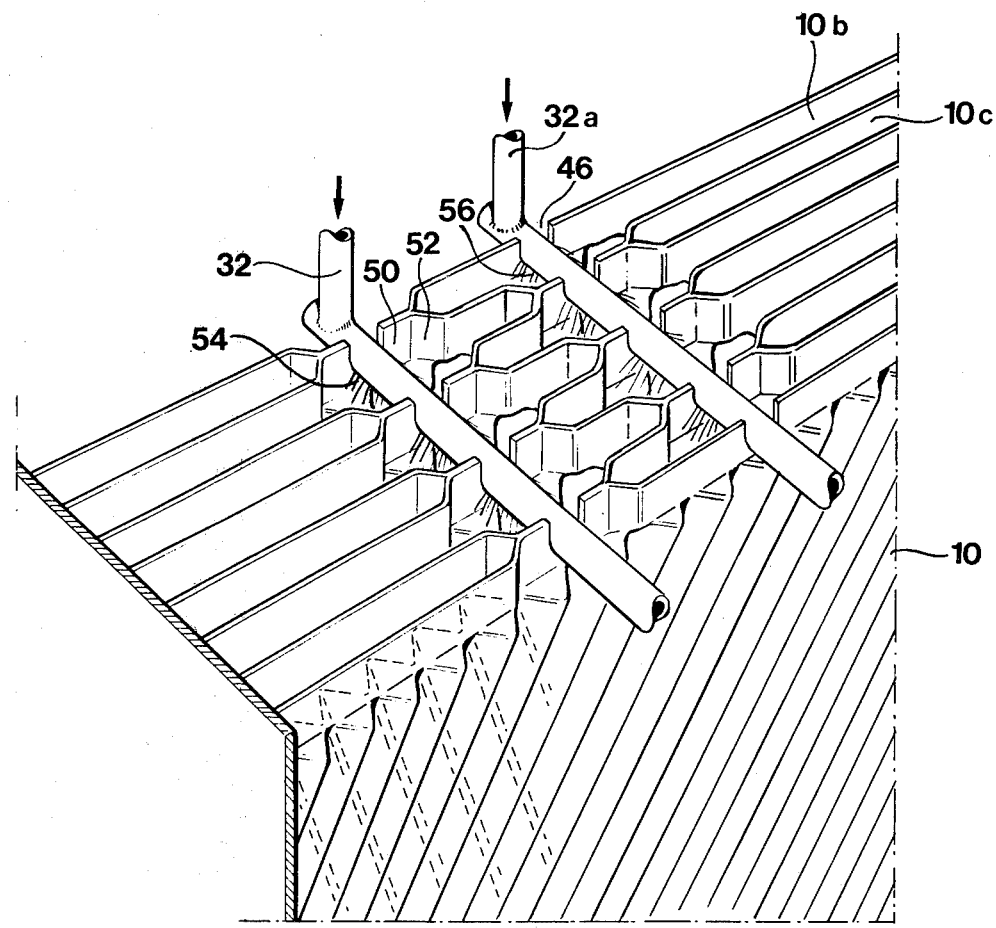
FIG. 3 is a perspective view of the top part of a modified embodiment of the contact body

The embodiment shown in FIG. 3 relates to a contact body in which several predetermined gaps of the body are excluded from supply of water in order that the dry air flowing in them shall prevent formation of mist when the air is discharged from the contact body as is described in the U.S. Pat. No. 3,997,635. The contact body 10 in FIG. 3 consists of corrugated layers 10b, 10c which are disposed in parallel so as to form between them the vertical gaps or channels. The layers 10b, 10c are at their top edge in the longitudinal direction by widened portions 50, 52 in pairs and alternately joined together so as to form funnel-shaped openings which alternately communicate with gaps separated from each other, as is described in the copending patent application Ser. No. 114,199 filed Jan. 22, 1980 and now U.S. Pat. No. 4,337,216, which was a continuation of application Ser. No. 944,248 filed Sept. 21, 1978 and now abandoned. As is easily understood from the embodiment shown in FIG. 3 by the water jets denoted 54, 56, the pipes 32 and 32a will supply only every second gap with water. In this manner it is rendered possible, as is explained in more detail in the afore-cited patent application, to keep certain predetermined gaps dry, such as every second gap in the shown embodiment, while water is poured through one or the other of the supply pipes 32, 32a, into gaps located therebetween. When the whole contact body is to be wetted with water, water is supplied through both pipes 32 and 32a simultaneously.

Figure 4:
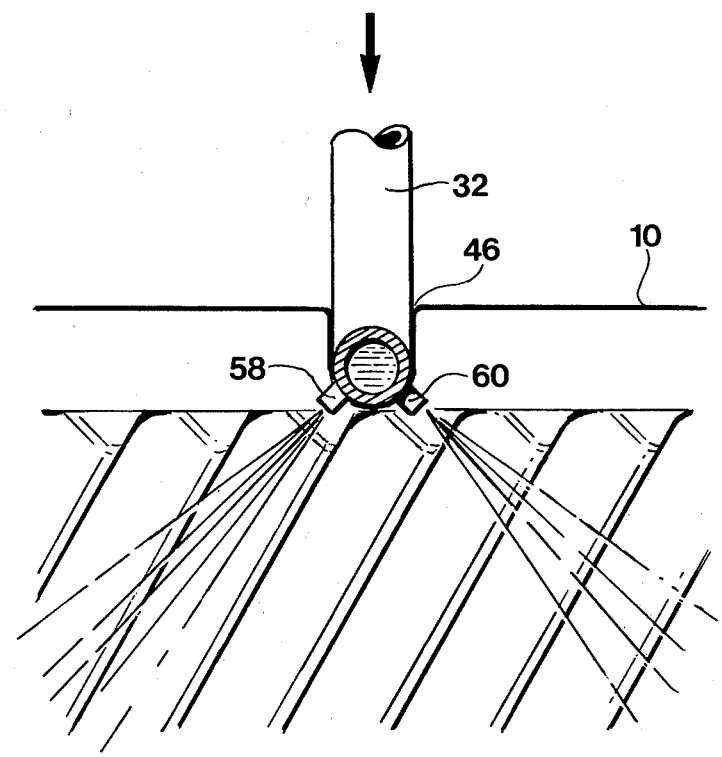
FIG. 4 shows a cross-section through the top part of the contact body and a supply pipe for water.

In FIG. 4, there is shown a section through the top part of the contact body 10 and the supply pipe 32. As is apparent, the horizontal part of the pipe is positioned embedded in the recesses 46 mentioned hereinbefore and the pipe is formed with openings which are located below the top edges of the layers so that the water jets leaving the openings meet the layers inside the gaps only. The openings have in the embodiment shown in FIG. 4 most suitably the shape of mouthpieces 58, 60 which by their direction and number impart to the water good distribution in the moment of discharge of the water out of the pipe 34. This distribution is thereupon continued by the inclination of the corrugations, which inclination can be less steep in the upper part of the contact body 10, as shown and described in connection with FIG. 1.

It is clear that the presented embodiment is an example only of realization of the invention and that this can be modified and varied within the scope of the appended claims.

We claim:

1. A supply device for use in a evaporative contact body of the multi-layer type having gaps between the layers of the body to which water is supplied from above and air is supplied from below, said device comprising water supply pipes and means for forming jets of water and directing said water jets deep into said gaps, said layers of the body having upper edges and laterally spaced recesses formed by said upper edges, said pipes being located in direct contact with said upper edges of the layers of the contact body within said recesses and said water jet directing means being formed on said water supply pipes and located between and inwardly spaced from said layers to direct said water jets directly inside the gaps between said layers in the path of air flow through the contact body whereby the formation of fine drops of water normally formed by water jets striking the upper edge of the contact body is avoided, said layers of the contact body comprising first and second sets of corrugated sheets disposed alternately with each other to promote rapid distribution of said water laterally within the contact body.

2. The device of claim 1 wherein said pipes are tubular shaped and at least partially received within said recesses below the top surface of the contact body.

3. The device of claim 1 wherein the pipes extend transversely to the planes of the layers and are embedded in said recesses in the top edges of said layers.

4. The device of claim 1 wherein said water jet directing means includes small tubes angularly extending down into the individual gaps between said layers, said tubes having lower ends with outlet openings for the water formed in said lower ends.

5. The device of claim 1, 2, 3 or 4 wherein said corrugations, at least in the upper part of the contact body, have an angle of inclination to the horizontal which is smaller than the remainder of the corrugations, thereby insuring greater lateral distribution of the water in the portions of the contact body located therebelow.

* * * * *